(12) United States Patent
Suzuki

(10) Patent No.: US 11,318,382 B2
(45) Date of Patent: May 3, 2022

(54) GAME CONTROL METHOD, SYSTEM, AND NON-TRANSITORY COMPUTER-READABLE RECORDING MEDIUM

(71) Applicant: GREE, Inc., Tokyo (JP)

(72) Inventor: Koichi Suzuki, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/018,012

(22) Filed: Sep. 11, 2020

(65) Prior Publication Data

US 2020/0406138 A1 Dec. 31, 2020

Related U.S. Application Data

(63) Continuation of application No. 16/689,483, filed on Nov. 20, 2019, now Pat. No. 11,219,826, which is a
(Continued)

(30) Foreign Application Priority Data

Feb. 25, 2014 (JP) .................................. 2014-034003

(51) Int. Cl.
*A63F 13/44* (2014.01)
*A63F 13/58* (2014.01)
(Continued)

(52) U.S. Cl.
CPC .............. *A63F 13/44* (2014.09); *A63F 13/58* (2014.09); *A63F 13/69* (2014.09); *A63F 13/822* (2014.09)

(58) Field of Classification Search
None
See application file for complete search history.

(56) References Cited

U.S. PATENT DOCUMENTS

| 5,662,332 A | 9/1997 | Garfield |
| 7,905,769 B1 | 3/2011 | Harrison, Jr. |

(Continued)

FOREIGN PATENT DOCUMENTS

| JP | 2001-129254 A | 5/2001 |
| JP | 2002-301264 A | 10/2002 |

(Continued)

OTHER PUBLICATIONS

Paper: Defendant Supercell Oy's Amended Invalidity Contentions and Disclosures Under Local Patent Rules 3-3, 3-4, 3-6, in connection with Civil Action No. 2:19-cv-00413-JRG-RSP, *Gree, Inc.*, Plaintiff, v. *Supercell Oy*, Defendant, dated Dec. 23, 2020, 5 pp.
(Continued)

*Primary Examiner* — Damon J Pierce
(74) *Attorney, Agent, or Firm* — Maier & Maier, PLLC

(57) ABSTRACT

Players with a wide range of levels or attack strength can enjoy a time-limited group battle, and the participation rate can be expected to improve throughout the set time slot. A battle time managing unit refers to a timer and a memory resource to manage the time of a battle between groups. A battle condition extraction unit refers to the memory resource and checks whether to change a battle condition during the time of the battle. A target changing unit refers to the memory resource to set a target of change based on the battle condition. A battle condition changing unit changes the battle condition for the target of change that was selected by the target changing unit. Based on the changed battle condition, a battle rendering unit executes rendition processing for the game related to the battle.

21 Claims, 7 Drawing Sheets

Related U.S. Application Data continuation of application No. 14/631,221, filed on Feb. 25, 2015, now Pat. No. 10,518,177.

(51) Int. Cl.
  *A63F 13/822* (2014.01)
  *A63F 13/69* (2014.01)

(56) References Cited

U.S. PATENT DOCUMENTS

| | | | |
|---|---|---|---|
| 2002/0013168 | A1 | 1/2002 | Kameta et al. |
| 2004/0137975 | A1 | 7/2004 | Yamada |
| 2004/0143852 | A1 | 7/2004 | Meyers |
| 2005/0054402 | A1 | 3/2005 | Noguchi et al. |
| 2005/0255923 | A1 | 11/2005 | Aoki |
| 2006/0223633 | A1* | 10/2006 | Hamamoto .............. A63F 13/42 463/30 |
| 2007/0066403 | A1 | 3/2007 | Conkwright |
| 2007/0265046 | A1 | 11/2007 | Sato |
| 2008/0026847 | A1 | 1/2008 | Mueller et al. |
| 2008/0254849 | A1 | 10/2008 | Nomura et al. |
| 2013/0281173 | A1 | 10/2013 | Gilson et al. |
| 2013/0288794 | A1 | 10/2013 | Ando et al. |
| 2013/0344940 | A1 | 12/2013 | Kurabayashi et al. |
| 2014/0080600 | A1 | 3/2014 | Knutsson et al. |
| 2014/0213356 | A1 | 7/2014 | Iwano et al. |
| 2014/0295973 | A1 | 10/2014 | Inagawa et al. |
| 2014/0349723 | A1 | 11/2014 | Nakatani et al. |
| 2015/0148131 | A1 | 5/2015 | Owaku |

FOREIGN PATENT DOCUMENTS

| | | | |
|---|---|---|---|
| JP | 2003-123089 | A | 4/2003 |
| JP | 2005-034276 | A | 2/2005 |
| JP | 2005-261723 | A | 9/2005 |
| JP | 2006-014956 | A | 1/2006 |
| JP | 2008-113858 | A | 5/2008 |
| JP | 2011-098013 | A | 5/2011 |
| JP | 2013-034828 | A | 2/2013 |
| JP | 2013-244126 | A | 12/2013 |
| JP | 5382896 | B1 | 1/2014 |
| JP | 2014-226408 | A | 12/2014 |
| JP | 2015-157002 | A | 9/2015 |
| WO | 2013/168379 | A1 | 11/2013 |

OTHER PUBLICATIONS

Paper: Supercell Oy's "Exhibit A-11—Preliminary Invalidity Contentions—U.S. Appl. No. 10/518,177 to Suzuki Based on Bloons TD Battles by Ninja Kiwi ("Bloons") in view of Prime World Defenders ("Prime World") by Nival", 50 pp.
Paper: Supercell Oy's "Exhibit B-11—Preliminary Invalidity Contentions—U.S. Appl. No. 10/583,362 to Suzuki Based on Bloons TD Battles by Ninja Kiwi ("Bloons") in view of Prime World Defenders ("Prime World") by Nival", 65 pp.
Paper: Petition for Post-Grant Review of U.S. Pat. No. 10,518,177 dated Sep. 29, 2020, filed in connection with USPTO, PTAB, *Supercell Oy*, Petitioner, v. *Gree, Inc.*, Patent Owner, Post Grant Review No. TBD for U.S. Pat. No. 10,518,177 B2, 86 pages.
Exhibit 1005: Declaration of Steve Meretzky in Support of Petition for Post Grant Review of U.S. Pat. No. 10,518,177 dated Sep. 29, 2020, filed in connection with USPTO, PTAB, *Supercell Oy*, Petitioner, v. *Gree, Inc.*, Patent Owner, Post Grant Review No. TBD for U.S. Pat. No. 10,518,177 B2, 98 pages.
Exhibit 1006: Resume of Steve Meretzky, filed in connection with USPTO, PTAB, *Supercell Oy*, Petitioner, v. *Gree, Inc.*, Patent Owner, Post Grant Review No. TBD for U.S. Pat. No. 10,518,177 B2, 5 pages.
Exhibit 1008: Microsoft Computer Dictionary Fourth Edition, filed in connection with USPTO, PTAB, *Supercell Oy*, Petitioner, v. *Gree, Inc.*, Patent Owner, Post Grant Review No. TBD for U.S. Pat. No. 10,518,177 B2, 3 pages.
Exhibit 1009: [Hearthstone] Master Hearthstone in 10 Minutes! The Ultimate Beginner's Guide, filed in connection with USPTO, PTAB, *Supercell Oy*, Petitioner, v. *Gree, Inc.*, Patent Owner, Post Grant Review No. TBD for U.S. Pat. No. 10,518,177 B2, 3 pages.
Exhibit 1010: Master Hearthstone in 10 Minutes! The Ultimate Beginner's Guide, filed in connection with USPTO, PTAB, *Supercell Oy*, Petitioner, v. *Gree, Inc.*, Patent Owner, Post Grant Review No. TBD for U.S. Pat. No. 10,518,177 B2, 2 pages.
Exhibit 1016: Dynamic game difficulty balancing, filed in connection with USPTO, PTAB, *Supercell Oy*, Petitioner, v. *Gree, Inc.*, Patent Owner, Post Grant Review No. TBD for U.S. Pat. No. 10,518,177 B2, 4 pages.
Exhibit 1017: BlizzCon Virtual Ticket, filed in connection with USPTO, PTAB, *Supercell Oy*, Petitioner, v. *Gree, Inc.*, Patent Owner, Post Grant Review No. TBD for U.S. Pat. No. 10,518,177 B2, 2 pages.
Exhibit 1018: FAQ-Hearthstone, filed in connection with USPTO, PTAB, *Supercell Oy*, Petitioner, v. *Gree, Inc.*, Patent Owner, Post Grant Review No. TBD for U.S. Pat. No. 10,518,177 B2, 3 pages.
Exhibit 1019: Hearthstone:Heroes of Warcraft Official Game Site, filed in connection with USPTO, PTAB, *Supercell Oy*, Petitioner, v. *Gree, Inc.*, Patent Owner, Post Grant Review No. TBD for U.S. Pat. No. 10,518,177 B2, 3 pages.
Paper: Claim Construction Memorandum Opinion and Order dated Nov. 6, 2020 (Supercell Exhibit 1021, Document 85), in connection with Case No. 2:19-cv-00413-JRG-RSP, *Gree, Inc.*, Plaintiff, v. *Supercell Oy*, Defendant, 40 pp.
Google Certificate of Authenticity by Madeline Byers, Custodian of Records for Google LLC dated Oct. 8, 2020 (Supercell Exhibit 1022), 2 pp.
Affidavit of Elizabeth Rosenberg, Records Request Processor at Internet Archive dated Oct. 6, 2020 (Supercell Exhibit 1023), 26 pp.
Eight Senses, PC Game Soft "Battle Line" package cover, Jun. 30, 2009 (1 pg.).
Battle Line Rule Manual, printed May 10, 2018 (30 pgs.).
4 Gamer. Net, "Professioinal Baseball Famista Online" is undeniably "Famista", Aug. 17, 2006 (5 pgs.).
Konami Corporation, Game Boy Advance "Captain Tsubasa the path of glory" Instruction Manual, Feb. 21, 2002 (35 pgs.).
Takaaki Yamazaki, A Report on Operation Check of Captain Tsubasa's configuration, submitted Jul. 12, 2018, in Case No. H30 YO 22006 of JP Patent No. 6228252 (14 pgs.).
Gree's Third Brief, submitted Jul. 30, 2018, in Case No. H30 YO 22006 of JP Patent No. 6228252 (28 pgs.).
Supercell's Fourth Brief, submitted Aug. 31, 2018, in Case No. H30 YO 22006 of JP Patent No. 6228252 (34 pgs.).
Tsubasa Yamamoto, Second Report on the Configuration of Yu-Gi-Oh 5D's, submitted Aug. 31, 2018, in Case No. H30 YO 22006 of JP Patent No. 6228252 (4 pgs.).
Takaaki Yamazaki, A Report on Operation Check of Captain Tsubasa's configuration "Shoot scene", submitted Aug. 31, 2018, in Case No. H30 YO 22006 of JP Patent No. 6228252 (6 pgs.).
Nippon Professional Baseball, 2013 Official Baseball Rules, Apr. 1, 2013 (4 pgs.).
Toshiki Aigawa, Net back relay—Toshiki Aigawsa's Netterland, printed Aug. 22, 2018 (4 pgs.).
Super-famicon.jp, Tecmo Super Baseball, printed Aug. 22, 2018 (1 pg.).
Supercell's First Brief, submitted Jul. 12, 2018, in Case No. H30 YO 22036 of JP Patent No. 6295002 (30 pgs.).
GREE's Second Brief, submitted Sep. 7, 2018, in Case No. H30 YO 22036 of JP Patent No. 6295002 (18 pgs.).
Japanese document Case for Canceling Patent Cancellation Decision-Defendant's First Brief dated Dec. 5, 2018, in connection with JP Court Case No. H30-10109 of JP Patent No. 6043844 (29 pgs.).
Revocation Decision of the JIPO Judgment to Cancel Patent dated Mar. 26, 2019, in connection with JP Court Case No. H30-10109 of JP Patent No. 6043844; 57 pages.
U.S. Office Action dated Aug. 2, 2019, in connection with corresponding U.S. Appl. No. 16/445,642 (17 pgs.).

(56) References Cited

OTHER PUBLICATIONS

Paper: Document 29, filed Mar. 24, 2020, Defendant Supercell Oy's Motion to Dismiss, Civil Action No. 2:19-cv-00413-JRG, in the United Sates District Court for the Eastern District of Texas, Marshall Division, 49 pgs.
Paper: Document 34, filed Apr. 8, 2020, Gree, Inc.'s Opposition to Defendant Supercell Oy's Motion to Dismiss, Civil Action No. 2:19-cv-00413-JRG-RSP, in the United Sates District Court for the Eastern District of Texas, Marshall Division, 91 pgs.
Paper: Document 43, filed Apr. 15, 2020, Defendant Supercell Oy's Reply in Support of its Motion to Dismiss, Civil Action No. 2:19-cv-00413-JRG, in the United Sates District Court for the Eastern District of Texas, Marshall Division, 16 pgs.
Paper: Document 44, filed Apr. 15, 2020, Reply Declaration of Jeffrey Ware in Support of Defendant's Motion to Dismiss, Civil Action No. 2:19-cv-00413-JRG, in the United Sates District Court for the Eastern District of Texas, Marshall Division, 212 pgs.
Paper: Document 45, filed Apr. 23, 2020, Plaintiff Gree, Inc.'s Sur-Reply to Defendant Supercell Oy's Reply in Support of its Motion to Dismiss, Civil Action No. 2:19-cv-00413-JRG-RSP, in the United Sates District Court for the Eastern District of Texas, Marshall Division, 17 pgs.
Japanese Office Action dated Jan. 7, 2020, in connection with counterpart JP Application No. 2018-236124 (5 pgs , including machine-generated English translation).
Paper: "Gree, Inc.'s Sur-Reply in Opposition to Supercell Oy's Motion for Summary Judgment of Invalidity Under 35 U.S.C. § 101 [DKT. 104]", dated Mar. 4, 2021, in connection with *Gree, Inc.*, Plaintiff v *Supercell Oy*, Defendant, Case No. 2:19-cv-00413-JRG-RSP, 16 pages.
Paper: "Defendant Supercell Oy's Motion for Summary Judgment of Invalidity Under 35 U.S.C. § 101", dated Feb. 12, 2021, in connection with *Gree, Inc.*, Plaintiff v. *Supercell Oy*, Defendant, Case No. 2:19-cv-00413-JRG-RSP, 30 pages.
Paper: "Plaintiff Gree, Inc.'s Opposition to Defendant Supercell Oy's Motion for Summary Judgment of Invalidity Under 35 U.S.C. § 101", dated Feb. 16, 2021, in connection with *Gree, Inc.*, Plaintiff v. *Supercell Oy*, Defendant, Case No. 2:19-cv-00413-JRG-RSP, 65 pages.
Paper: "Defendant Supercell Oy's Reply in Support of Motion for Summary Judgment Under 35 U.S.C. § 101", dated Feb. 24, 2021, in connection with *Gree, Inc.*, Plaintiff v. *Supercell Oy*, Defendant, Case No. 2:19-cv-00413-JRG-RSP, 15 pages.
Decision of Refusal dated Mar. 9, 2021 in corresponding Japanese application No. 2018-236124, 2 pgs.
Paper: "Decision Denying Institution of Post-Grant Review 35 U.S.C. § 324(a)", dated Apr. 14, 2021, in connection with USPTO, PTAB, *Supercell Oy*, Petitioner, v. *Gree, Inc.*, Patent Owner, Post Grant Review No. PGR2020-00088 for Patent 10,518,177 B2, 15 pages.
Paper: "Petitioner's Reply to Patent Owner's Preliminary Response Pursuant to 37 C.F.R. § 42.208(c)", dated Apr. 2, 2021, in connection with USPTO, PTAB, *Supercell Oy*, Petitioner, v. *Gree, Inc.*, Patent Owner, Post Grant Review No. PGR2021-00014 for Patent 10,583,362 B2, 14 pages.
Paper: "Patent Owner's Sur-Reply to Petitioner's Reply to Patent Owner's Preliminary Response", dated Apr. 16, 2021, in connection with USPTO, PTAB, *Supercell Oy*, Petitioner, v. *Gree, Inc.*, Patent Owner, Post Grant Review No. PGR2021-00014 for Patent 10,583,362 B2, 15 pages.
Paper: "Decision Denying Institution of Post-Grant Review 35 U.S.C. § 324(a)", dated May 19, 2021, in connection with USPTO, PTAB, *Supercell Oy*, Petitioner, v. *Gree, Inc.*, Patent Owner, Post Grant Review No. PGR2021-00014 for Patent 10,583,362 B2, 14 pages.
Japanese Office Action dated Apr. 21, 2015, in connection with JP Application No. 2014-034003 (7 pgs).
Japanese Office Action dated Sep. 8, 2015, in connection with corresponding JP Application No. 2015-158515 (7 pgs, including English translation).
Official Decision of Refusal of corresponding JP2015-158515 dated Jan. 19, 2016. 5 pgs.
Japanese Office Action dated Apr. 4, 2017, in connection with corresponding JP Application No. 2016-054177 (10 pgs., including English translation).
Qbist Inc., The PlayStation2 Books Iron Fist 5 Perfect Guide, Softbank Publishing Inc., Jun. 30, 2005, Second Edition, p. 27 (4 pgs.).
Studio BentStuff Co., Ltd., Seiken Densetsu 4 Dissolution Book, Koichi Hamamura, Mar. 6, 2007, First Edition, p. 426 (3 pgs.).
Japanese Office Action dated Aug. 15, 2017, in connection with corresponding JP Application No. 2016-054177 (8 pgs., including English translation).
"Puyopuyo Tetris Manual" pp. 1-29, Sega Corporation, Published: Feb. 6, 2014.
"Nico Nico Pedia, "Puyopuyo"", Daihyakka News, Inc., Published: Oct. 9, 2017.
"Nintendo Homepage, "Rules for Tetris"", Nintendo Co., Ltd., Published: Oct. 9, 2017.
"Konami Official Guide Winning Eleven 2000" pp. 4-13, Konami Corporation, Published: Oct. 28, 2000.
"Winning Eleven 2000 Manual" pp. 1-38, Konami Corporation, Published: Oct. 28, 2000.
"League soccer Prime Goal 3 winning strategy" pp. 4-11, Futabasha Publishers Ltd., Published: 1995.
"Japan Football Association Homepage, "V-goal system"", Japan Football Association, Published: Sep. 21, 2017.
"Soccer Rules & Referee's officiating Techniques" pp. 160-163, Taishukan Publishing Co., Ltd., Published: Dec. 20, 2001.
Office Action dated May 22, 2018 in corresponding Japanese Application No. 2018-025731; 13 pages.
Ayu; Dragon's Shadow; BoomApp Games; [online] URL; http://boom-app.com/etry/dragons-shadow-event02; Jun. 3, 2013; search on May 7, 2018; 7 pages.
Gpara.com; Gree "Tanken Driland", The 2nd Guilde Battle Event "Guild League"; [online] URL; httpl/www.gpara.com/infos/view/3235; Jun. 27, 2013; search on May 7, 2018; 4 pages.
Japanese filing of oppositions to grant of patent dated Jun. 14, 2017, in connection with JP Opposition Case No. 2017-700609 of JP Patent No. 6043844 (51 pgs.).
Japanese description of evidence dated Jun. 14, 2017, in connection with JP Opposition Case No. 2017-700609 of JP Patent No. 6043844 (9 pgs.).
Japanese Notice of Reasons for Revocation of a Patent dated Oct. 4, 2017, in connection with JP Opposition Case No. 2017-700609 of JP Patent No. 6043844 (4 pgs., including English translation).
Japanese Written Opinion dated Dec. 1, 2017, in connection with JP Opposition Case No. 2017-700609 of JP Patent No. 6043844 (9 pgs.).
Japanese Notice of Reasons for Revocation of a Patent dated Jan. 15, 2018, in connection with JP Opposition Case No. 2017-700609 of JP Patent No. 6043844 (22 pgs., including English translation).
Japanese Correction Request dated Mar. 16, 2018, in connection with JP Opposition Case No. 2017-700609 of JP Patent No. 6043844 (7 pgs.).
Japanese Corrected Claims dated Mar. 16, 2018, in connection with JP Opposition Case No. 2017-700609 of JP Patent No. 6043844 (2 pgs.).
Japanese Written Opinion dated Mar. 16, 2018, in connection with JP Opposition Case No. 2017-700609 of JP Patent No. 6043844 (20 pgs ).
Japanese Description of Evidence dated Mar. 16, 2018, in connection with JP Opposition Case No. 2017-700609 of JP Patent No. 6043844 (2 pgs.).
Japanese notification of duplicate copy of the Written Opinion dated Jul. 2, 2018, in connection with JP Opposition Case No. 2017-700609 of JP Patent No. 6043844 (1 pgs.).
Japanese duplicate copy of the Written Opinion issued on May 9, 2018, dated Jul. 2, 2018, in connection with JP Opposition Case No. 2017-700609 of JP Patent No. 6043844 (16 pgs.).

(56) References Cited

OTHER PUBLICATIONS

Japanese Decision on Patent Opposition dated Jun. 19, 2018, received on Jul. 3, 2018, in connection with JP Opposition Case No. 2017-700609 of JP Patent No. 6043844 (26 pgs., including English translation).
Japanese Omihara watersweight fight—fighting cap (web page) dated Oct. 24, 2013 (search on May 11, 2017), in connection with JP Opposition Case No. 2017-700609 of JP Patent No. 6043844 (108 pgs., including a partial English translation). http://seesaawiki.jp/fantasica/d/%C2%E7%B3%A4%B8%B6%BF%E5%BE%E5%C0%EF.
Japanese [Exclusive Information] Finally "Dolly" to Famitsu App (web page) dated Aug. 22, 2012 (saved on Aug. 27, 2012, search on May 11, 2017), in connection with JP Opposition Case No. 2017-700609 of JP Patent No. 6043844 (11 pgs., including partial English translation). http://web.archive.org/web/20120827001459/http://app.famitsu.com:80/20120822_84305/.
Japanese (Dr. X Department) Dedicated to beginners! Explanation about "Drago Leagues" (Capture 4th Baron Masarl Hen) (web page) dated Mar. 25, 2013 (saved on Mar. 27, 2013, search on May 11, 2017), in connection with JP Opposition Case No. 2017-700609 of JP Patent No. 6043844 (19 pgs., including partial English translation), http://web.archive.org/web/20130327024836/https://app.famitsu.com/20130325_143480/.
Enterbrain Inc., "Great collision guardian break", Weekly Famitsu (Famitsu mobage) (web page) dated Jan. 10, 2013, in connection with JP Opposition Case No. 2017-700609 of JP Patent No. 6043844 (5pgs., including partial English translation).
Great clash! Guardian Break Characteristic Event Bonus Game Strategy Information (GREE Mobage—Other), dated Oct. 21, 2012 (search on May 11, 2017), in connection with JP Opposition Case No. 2017-700609 of JP Patent No. 6043844 (7 pgs., including partial English translation), http://barbarossa7.doorblog.jp/archives/19185151.html.
"Ixion Saaga" Posted a Tactical Battle Test play report. What is the evaluation of the newly added online matchup "base battle" (Crush or Build)? (web page) dated Jun. 6, 2012 (saved on Jun. 5, 2012, search on May 31, 2017), in connection with JP Opposition Case No. 2017-700609 of JP Patent No. 6043844 (23 pgs., including partial English translation.). https://web.archive.org/web/20120605172904/http://www.4gamer.net:80/games/136/G013604/20120601030/.
State-of-the-art online action RPG C9 (Continent of the Ninth) Pmang Official Site Game Guide (web page) dated Sep. 1, 2013 (saved on Sep. 1, 2013, search on May 31, 2017), in connection with JP Opposition Case No. 2017-700609 of JP Patent No. 6043844 (25 pgs., including partial English translation). https://web.archive.org/web/20130901235716/http:/c9.pmang.jp/game_guides/266.
Gzbrain Inc., "Delivering a game guide of Simulation RPG" Striking Fantasy "that marveled 4 million people worldwide!", Famitsu App, dated Jun. 25, 2013, in connection with JP Opposition Case No. 2017-700609 of JP Patent No. 6043844 (19 pgs.), https://app.famitsu.com/20130625_180640/.
Sanseido Co., Ltd., "Daijirin" (Dictionary), Second Edition, published by Sanseido Co., Ltd., dated Oct. 1, 1999, in connection with JP Opposition Case No. 2017-700609 of JP Patent No. 6043844 (3 pgs.).
Takaaki Yamazaki, A Report on Operation Check of Virtua Striker, submitted Oct. 17, 2017, in Case No. H29 YO 22040 of JP Patent No. 5793592 (11 pgs.).
Supercell's First Brief, submitted Aug. 22, 2017, in Case No. H29 YO 22040 of JP Patent No. 5793592 (39 pgs.).
Supercell's Third Brief, submitted Oct. 17, 2017, in Case No. H29 YO 22040 of JP Patent No. 5793592 (27 pgs.).
Answer, submitted Sep. 20, 2017, in Case No. H29 YO 22175 of JP Patent No. 6043844 (37 pgs.).
Supercell's Second Brief, submitted Nov. 14, 2017, in Case No. H29 YO 22175 of JP Patent No. 6043844 (29 pgs.).
Supercell's Second Brief, submitted Jun. 8, 2018, in Case No. H30 YO 22006 of JP Patent No. 6228252 (42 pgs.).

Wikipedia page, Yu-Gi-Oh! 5D's Stardust Accelerator-World Champoinship 2009-, printed May 15, 2018 (5 pgs.).
Konami Digital Entertainment, "Yu-Gi-Oh! ZEXAL Official Card Game" Official Rulebook, dated Mar. 19, 2011 (32 pgs.).
Biglobe News, Yu-Gi-Oh! card certified as Guinness, Jun. 16, 2011 (4 pgs.).
Konami Digital Entertainment, Yu-Gi-Oh! 5D's Stardust Accelerator World Championship 2009 Owner's Manual, Mar. 26, 2009 (24 pgs.).
Tsubasa Yamamoto, A Report on the configuration of Yu-Gi-Oh 5D's, submitted May 21, 2018, in Case No. H30 YO 22006 of JP Patent No. 6228252 (8 pgs.).
Roger Goodell, Commissioner, "2013 Official Playing Rules of the National Football League", 120 pp.
Web page: "Bloon Prices", printed on May 30, 2020, 5 pp., URL: https://bloons.fandom.com/wiki/Bloon_Prices?oldid=118412.
Business Wire, A Berkshire Hathaway Company, Arena Heroes, "Zattikka Releases First Cross-Platform Tactical Battle Arena Game Arena of Heroes, Available Now for PC/Mac and iPad, Free-to-Play Title is the First Multiplayer Online Battle Arena Game with Asynchronous Gameplay", Jun. 27, 2013, Contacts: fortyseven communications, Sara Black, 2 pp.
Web page: "Wartune Guide", printed May 30, 2020, 2 pp., URL: https://web.archive.org/web/20130910100821/http://elusionwartune.weebly.com/magegems.html.
Web page: "Grave (Plants vs. Zombies)", printed May 28, 2020, 4 pp., URL: https://plantsvszombies.fandom.com/wiki/Grave_(PvZ)?direction=prev&oldid=218667.
Web page: "Peashooter", printed May 28, 2020, 9 pp., URL: https://plantsvszombies.fandom.com/wiki/Peashooter?oldid=236850.
Web page: "Bloons TD Battles", printed May 30, 2020,4 pp., URL: https://bloons.fandom.com/wiki/Bloons_TD_Battles?oldid=122154.
Web page: "Talents;", printed May 30, 2020, 2 pp., URL: https://web.archive.org/web/20130830104227/http:/elusionwartune.weebly.com/magetalents.html.
Web page: "Lives", printed May 30, 2020, 2 pp., URL: https://bloons.fandom.com/wiki/Lives?oldid=115106.
Web page: "Welcome to Plants vs. Zombies Wiki!", dated Jun. 1, 2020, 6 pp., URL: https://plantsvszombies.fandom.com/wiki/Main_Page.
Web page: "Wartune Patch 9.3, Unlock Your Devil's Armor", printed May 30, 2020, 2 pp., URL: https://web.archive.org/web/20200522070041/https://wartune.r2games.com/.
Web page: Review by Common Sense Media, "Plants vs. Zombies", printed May 28, 2020, 7 pp., URL: https://web.archive.org/web/20131225090327/https://www.commonsensemedia.org/game-reviews/plants-vs-zombies#panel-tab-1-4.
Web page: "Welcome to Plants vs. Zombies Wiki!", printed Jun. 1, 2020, 5 pp., URL: https://plantsvszombies.fandom.com/wiki/Main_Page.
Web page: "Squash (PvZ)", dated Jun. 1, 2020, 13 pp., URL: https://plantsvszombies.fandom.com/wiki/Squash_(PvZ)?oldid=230093.
Web page: "Versus Mode", printed May 28, 2020, 7 pp., URL: https://plantsvszombies.fandom.com/wiki/Versus_Mode?oldid=226190.
Web page: "Wall-nut (PvZ)", printed May 28, 2020, 13 pp., URL: https://plantsvszombies.fandom.com/wiki/Wall-nut_(PvZ)?oldid=224972.
Web page/Wikipedia: "Jeopardy!", printed Jun. 1, 2020, 22 pp., URL: https://web.archive.org/web/20140222052504/https:/en.wikipediaorg/wiki/Jeopardy!
Web page: "Character selection screen", from SmashWiki, the Super Smash Bros, wiki, printed Jun. 1, 2020, 3 pp., URL: https://web.archive.org/web/20130902085001/https://www.ssbwiki.com/Character_selection_screen.
Web page: "Damage", from SmashWiki, the Super Smash Bros, wiki, printed on Jun. 1, 2020, 3 pp., URL: https://web.archive.org/web/201 30718094758/http://www.ssbwiki.com/Damage.

(56) References Cited

OTHER PUBLICATIONS

Web page: "Pokémon Stadium 2", from SmashWiki, the Super Smash Bros. wiki, printed on Jun. 1, 2020, 4 pp., URL: https://web.archive.org/web/20130528222939/http://www.ssbwikicom/Pokémon_Stadium_2.
Web page: "Sudden Death", from SmashWiki, the Super Smash Bros. wiki, printed on Jun. 1, 2020, 3 pp., URL: https://web.archive.org/web/20130718134634/http://www.ssbwiki.com/Sudden_Death.
Seth Schiesel, "Video Games, Multiple Franchises in a Wii Free-for-All", The New York Times, Arts section, published on Mar. 14, 2008, printed on Jun. 1, 2020, 2 pp., URL: https://web.archive.org/web/20008121001432/http://www.nytimes.com/2008/03/14/arts/14smas.html.
Web page: "Time", from SmashWiki, the Super Smash Bros. wiki, printed on Jun. 1, 2020, 2 pp., URL: https://web.archive.org/web/20130616020723/http://www.ssbwiki.com/Time.
Web page: 1998 FIFA World Cup™—News—Golden Goal rule to be applied for the first time in the World Cup finals—FIFA.com, printed Jun. 1, 2020, 2 pp., URL: https://www.fifa.com/worldcup/news/golden-goal-rule-applied-for-the-first-time-the-world-cup-finals-71652.
Web page: PrintYourBrackets.com, "How to Run a Same Partner Euchre Tournament", printed Jun. 1, 2020, 3 pp., URL: https://www.printyourbrackets.com/how-to-run-euchre_tournament.html.
Web page: NHL.com—News, All-Access Vancouver, "Olympic rule book differs from NHL rules", Jan. 28, 2020, printed Jun. 1, 2020, 3 pp., URL: http://www.nhl.com/ice/m_news.htm?id=513766.
Invalidity Chart, Exhibit A-1—Preliminary Invalidity Contentions—U.S. Pat. No. 10,518,177 to Suzuki Based on Wartune, published by R2games ("Wartune"), and Wartune in combination with U.S. Pat. No. 2014/0349723 "Nakatani"), Yu-Gi-Oh!: The Eternal Duelist Soul by Konami ("Yu-Gi-Oh"), Pokemon Emerald, published by Nintendo ("Pokemon"), and/or Arena of Heroes developed by Sneaky Games ("Arena of Heroes"), 39 pp.
Invalidity Chart, "Exhibit A-2—Preliminary Invalidity Contentions—U.S. Pat. No. 10,518,177 to Suzuki Based on Bloons TD Battles by Ninja Kiwi ("Bloons")", 34 pp.
Invalidity Chart, Exhibit A-3—Preliminary Invalidity Contentions—U.S. Pat. No. 10,518,177 to Suzuki Based on Bloons TD Battles by Ninja Kiwi ("Bloons") or Bloons in combination with Super Smash Bros. Brawl by Nintendo ("SSBB"), 38 pp.
Invalidity Chart, "Exhibit A-4—Preliminary Invalidity Contentions—U.S. Pat. No. 10,518,177 to Suzuki Based on U.S. Patent Application Publication No. 2013/0281173 to Gilson et al. ("Gilson"), or Gilson in combination with U.S. Pat. No. 7,905,769 to Harrison, Jr. ("Harrison")", 41 pp.
Invalidity Chart, "Exhibit A-5—Preliminary Invalidity Contentions—U.S. Pat. No. 10,518,177 to Suzuki Based on U.S. Patent Application Publication No. 20020013168 to Kameta et al. ("Kameta") and US. Patent Application Publication No. 2014/0080600 to Knutsson et al. ("Knutsson")", 33 pp.
Invalidity Chart, "Exhibit A-6—Preliminary Invalidity Contentions—U.S. Pat. No. 10,518,177 to Suzuki Based on U.S. Patent Application Publication No. 2014/0080600 to Knutsson et al. ("Knutsson") and U.S. Pat. No. 7,905,769 to Harrison ("Harrison")", 38 pp.
Invalidity Chart, "Exhibit A-7—Preliminary Invalidity Contentions—U.S. Pat. No. 10,518,177 to Suzuki Based on U.S. Patent Application Publication No. 2014/0349723 to Nakatani ("Nakatani") and Nakatani in combination with a video game entitled "Wartune", released Oct. 25, 2012, as evidenced in https://www.youtube.com/watch?v=8AmJJ6SdPqs ("Wartune")", 39 pp.
Invalidity Chart, "Exhibit A-8—Preliminary Invalidity Contentions—U.S. Pat. No. 10,518,177 to Suzuki Based on Plants vs. Zombies by PopCap Games ("PvZ")", 40 pp.
Invalidity Chart, "Exhibit A-9—Preliminary Invalidity Contentions—U.S. Pat. No. 10,518,177 to Suzuki Based on WO2013168379A1 to Suzuki ("Suzuki") in Combination with U.S. Patent Application Publication No. 2014/0349723 to Nakatani et al. ("Nakatani"), and/or Japanese Patent Application Publication No. 2005261723 to Kazunobu et al. ("Kazunobu")", 35 pp.
Invalidity Chart, "Exhibit A-10—Preliminary Invalidity Contentions—U.S. Pat. No. 10,518,177 to Suzuki Based on U.S. Pat. No. 7,905,769 to Harrison ("Harrison") and Harrison in Combination with U.S. Pat. App. Pub. 2013/0281173 to Gilson ("Gilson")", 46 pp.
Invalidity Chart, "Exhibit B-1—Preliminary Invalidity Contentions—U.S. Pat. No. 10,583,362 to Suzuki Based on Bloons TD Battles by Ninja Kiwi ("Bloons")", 43 pp.
Invalidity Chart, "Exhibit B-2—Preliminary Invalidity Contentions—U.S. Pat. No. 10,583,362 to Suzuki Based on Bloons TD Battles by Ninja Kiwi ("Bloons") or Bloons in combination with Super Smash Bros. Brawl by Nintendo ("SSBB")", 48 pp.
Invalidity Chart, "Exhibit B-3—Preliminary Invalidity Contentions—U.S. Pat. No. 10,583,362 to Suzuki Based on U.S. Patent Application Publication No. 2013/0281173 to Gilson et al. ("Gilson"), or Gilson in combination with U.S. Pat. No. 7,905,769 to Harrison, Jr. ("Harrison"), or Gilson in Combination with U.S Patent Application Publication No. 2005/0054402 to Noguchi et al. ("Noguchi")", 47 pp.
Invalidity Chart, "Exhibit B-4—Preliminary Invalidity Contentions—U.S. Pat. No. 10,583,362 to Suzuki Based on U.S. Patent Application Publication No. 2002/0013168 to Kameta et al. ("Kameta"), U.S. Patent Application Publication No. 2014/0349723 to Nakatani et al. ("Nakatani"), and U.S. Patent Application Publication No. 2005/0054402 to Noguchi et al. ("Noguchi")", 40 pp.
Invalidity Chart, "Exhibit B-5—Preliminary Invalidity Contentions—U.S. Pat. No. 10,583,362 to Suzuki Based on U.S. Patent Application Publication No. 2014/0080600 to Knutsson et al. ("Knutsson"), U.S. Patent Application Publication No. 2014/0349723 to Nakatani et al. ("Nakatani"), and U.S. Patent Application Publication No. 2005/0054402 to Noguchi et al. ("Noguchi")", 42 pp.
Invalidity Chart, "Exhibit B-6—Preliminary Invalidity Contentions—U.S. Pat. No. 10,583,362 to Suzuki Based on U.S. Patent Application Publication No. 2014/0349723 to Nakatani ("Nakatani") and Nakatani in Combination with U.S. Patent Application Publication No. 2005/0054402 to Noguchi et al. ("Noguchi")", 42 pp.
Invalidity Chart, "Exhibit B-7—Preliminary Invalidity Contentions—U.S. Pat. No. 10,583,362 to Suzuki Based on Plants vs. Zombies by PopCap Games ("PvZ") and PvZ in combination with U.S. Patent Application Publication No. 2014/0349734 to Nakatani et al. ("Nakatani") and/or U.S. Patent Application Publication No. 2005/0054402 to Noguchi et al. ("Noguchi")", 49 pp.
Invalidity Chart, "Exhibit B-8—Preliminary Invalidity Contentions—U.S. Pat. No. 10,583,362 to Suzuki Based on WO2013168379A1 to Suzuki ("Suzuki") and Suzuki in Combination with U.S. Patent Application Publication No. 2005/0054402 to Noguchi et al. ("Noguchi"), U.S. Patent Application Publication No. 2014/0349723 to Nakatani et al. ("Nakatani"), and/or Japanese Patent Application No. 2005261723 to Kazunobu et al. ("Kazunobu")", 40 pp.
Invalidity Chart, "Exhibit B-9—Preliminary Invalidity Contentions—U.S. Pat. No. 10,583,362 to Suzuki Based on Wartune, published by R2Games ("Wartune"), and Wartune in combination with U.S. Patent Publication 2014/0349723 ("Nakatani"), Yu-Gi-Oh!: The Eternal Duelist Soul by Konami ("Yu-Gi-Oh"), Pokeman Emerald, published by Nintendo ("Pokemon"), and/or Arena of Heroes developed by Sneaky Games ("Arena of Heroes")", 45 pp.
Invalidity Chart, "Exhibit B-10—Preliminary Invalidity Contentions—U.S. Pat. No. 10,583,362 to Suzuki Based on U.S. Pat. No. 7,905,769 to Harrison ("Harrison") and Harrison in Combination with U.S. Pat. App. Pub. 2013/0281173 to Gilson ("Gilson"), and/or U.S. Patent Application Publication No. 2005/0054402 to Noguchi et al. ("Noguchi")", 60 pp.
Paper: Defendant Supercell Oy's Invalidity Contentions and Disclosures Under Local Patent Rules 3-3 and 3-4, Civil Action No. 2:19-cv-00413-JRG, in the United States District Court for the Eastern District of Texas Marshall Division, dated Jun. 1, 2020, 22 pp.
Supercell Ineligibility Chart, "Preliminary Ineligibility Contentions—U.S. Pat. No. 10,518,177 to Suzuki", dated Jun. 1, 2020, 36 pp.
Supercell Ineligibility Chart, "Preliminary Ineligibility Contentions—U.S. Pat. No. 10,583,362 to Suzuki", dated Jun. 1, 2020, 40 pp.

(56) References Cited

OTHER PUBLICATIONS

Paper: Order, Civil Action No. 2:19-CV-00413-JRG, in the United States District Court for the Eastern District of Texas Marshall Division, dated Jun. 2, 2020, 2 pp.
Paper: Petitioner's Reply to Patent Owner'S Preliminary Response Pursuant to 37 C.F.R. § 42.208(c), dated Feb. 19, 2021, in connection with USPTO, PTAB, *Supercell Oy*, Petitioner, v. *Gree, Inc.*, Patent Owner, Post Grant Review No. PGR2020-00088 for Patent 10,518,177 B2, 14 pages.
Paper: Patent Owner's Preliminary Response Pursuant to 37 C.F.R. § 42.207, dated Mar. 15, 2021, in connection with USPTO, PTAB, *Supercell Oy*, Petitioner, v. *Gree, Inc.*, Patent Owner, Post Grant Review No. PGR2020-00088 for Patent 10,583,362 B2, 79 pages.
Paper: Patent Owner's Sur-Reply to Petitioner's Reply to Patent Owner's Preliminary Response, dated Mar. 5, 2021, in connection with USPTO, PTAB, *Supercell Oy*, Petitioner, v. *Gree, Inc.*, Patent Owner, Post Grant Review No. PGR2020-00088 for Patent 10,518,177 B2, 15 pages.
Office Action dated Feb. 9, 2021 in corresponding U.S. Appl. No. 16/689,483; 26 pages.
Paper: Patent Owner'S Preliminary Response Pursuant to 37 C.F.R. § 42.207, dated Jan. 19, 2021, in connection with USPTO, PTAB, *Supercell Oy*, Petitioner, v. *Gree, Inc.*, Patent Owner, Post Grant Review No. PGR2020-00088 for Patent 10,518,177, 75 pages.
Paper: Expert Report of Stacy Friedman, dated Dec. 23, 2020, in connection with *Gree, Inc.*, Plaintiff v. *Supercell Oy*, Defendant, Civil Action No. 2:19-cv-00413-JRG-RSP, 451 pages.
Paper: Rebuttal Expert Report of Dr. Robert AKL, D.S.C. Regarding Validity of United States Patent Nos. 10,518,177 and 10,583,362, dated Jan. 20, 2021, in connection with *Gree, Inc.*, Plaintiff v. *Supercell Oy*, Defendant, Case No. 2:19-cv-00413-JRG-RSP, 141 pages.
Paper: Defendant Supercell Oy'S Motion for Summary Judgment of Invalidity Under 35 U.S.C. § 101 dated Feb. 12, 2021, in connection with *Gree, Inc.*, Plaintiff v. *Supercell Oy*, Defendant, Civil Action No. 2:19-cv-00413-JRG-RSP, 127 pages.
Paper: Plaintiff Gree, Inc.'S Opposition to Defendant Supercell Oy'S Motion for Summary Judgment of Invalidity Under 35 U.S.C. § 101, dated Feb. 16, 2021, in connection with *Gree, Inc.*, Plaintiff v. *Supercell Oy*, Defendant, Case No. 2:19-cv-413-JRG-RSP, 65 pages.
Paper: Petition for Post-Grant Review of U.S. Pat. No. 10,583,362 dated Dec. 9, 2020, filed in connection with USPTO, PTAB, *Supercell Oy*, Petitioner, v. *Gree, Inc.*, Patent Owner, Post Grant Review No. TBD for U.S. Pat. No. 10,583,362 B2, 98 pages.

\* cited by examiner

GAME CONTROL METHOD, SYSTEM, AND NON-TRANSITORY COMPUTER-READABLE RECORDING MEDIUM

CROSS-REFERENCE TO RELATED APPLICATION

This application is a continuation of U.S. patent application Ser. No. 16/689,483, filed Nov. 20, 2019, entitled "GAME CONTROL METHOD, SYSTEM, AND NON-TRANSITORY COMPUTER-READABLE RECORDING MEDIUM," which claims benefit of priority to U.S. patent application Ser. No. 14/631,221, filed Feb. 25, 2015, entitled "GAME CONTROL METHOD, SYSTEM, AND NON-TRANSITORY COMPUTER-READABLE RECORDING MEDIUM," which claims benefit of priority to Japanese Patent Application No. 2014-034003 filed Feb. 25, 2014, the entire contents of which are incorporated herein by reference.

FIELD

Exemplary embodiments of the present disclosure relate to a game control method, a system, and a non-transitory computer-readable recording medium for providing client devices with a battle game over a network.

BACKGROUND

In recent years, online game services provided to client devices by a server device over a communication network have grown popular, and many game titles have been released on multiple platforms. These games are available in a variety of types and categories. Among such games, social games that allow multiple players to participate in the same game are especially booming.

One type of social game that has been proposed is a game in which a group (i.e. a guild) is formed whose members are characters each controlled by a player. The group then battles monster characters or the like (for example, JP2013-244126). Besides a "guild", such a group may be referred to as a "party", "team", "community", or the like depending on the game.

Recently, games with a function to allow groups of players to battle each other have been proposed. This function is particularly referred to as "Guild vs Guild", abbreviated as "GvG". In GvG, a predetermined time slot within a day is set, such as one hour from 20:00 to 21:00 (a shorter time slot being 30 minutes, and a longer time slot being two hours). The assembled groups then battle during this time slot (e.g. a "guild battle"). In some games, a plurality of time slots is set for holding a group battle.

A group battle during a predetermined time slot (i.e. a time slot group battle) is, for example, held as follows. One way is for a player who has entry authority, such as the master who is the leader of the group or the junior master who is the sub-leader, to enter the battle by selecting a predetermined time slot from among a plurality of set battle time slots. The group can thus participate in the group battle. Another way is for all groups to be randomly combined in time slots set in advance (such as one battle in the afternoon and another in the evening), with battles proceeding in accordance with the arbitrary combinations.

There is also a variety of types of battles. Examples include determining victory based on the total number of times characters of the opponent group are defeated, determining victory based on whether all of the participating characters in the opponent group are eliminated, and determining victory based on the amount of points, with a large number of points being awarded for defeating the boss of the opponent group.

SUMMARY

In a time slot group battle, the participation rate of group members in the battle tends to increase in the last half of the time slot. One reason is that players intentionally concentrate their attacks near the end of the time slot. This strategy does not provide the opponent time to counterattack and allows for an effective attack by augmenting the attack strength through consecutive attacks by multiple players in a short period of time in the last half (i.e. a combo). Another reason is that subduing the boss in the last half earns a high number of points, whereas even if players actively participate in the battle and attack the enemy in the first half, they may easily suffer a reverse in the last half. Other reasons include how limits are often placed on the number of attacks in the group battle, the battle points provided at the start of the battle, and the like, so that if players actively participate in the first half, they may use up their battle points, i.e. run out of ammo, in the last half and be unable to attack.

The game provider, however, wants players to participate actively in the battle throughout the entire time set for the group battle and to enjoy the game during the entire set time.

Another issue is that groups include players ranging from experienced game players to beginners with a low level and attack strength who have just started the game. Time slot group battles, however, are often not divided up by level, as is a battle with a strong enemy (raid boss) that appears during a quest. Hence, a battle may be fought with opponents having vastly dissimilar attack strengths. In this case, beginners not experienced with the game cannot fully understand effective attacks, such as combos, or the "unwritten rules" of an experienced group such as the timing within the guild for attacks. Beginners may therefore be unsuccessful. As a result, beginners may end up passively participating in a group battle. Under these circumstances, is therefore preferable to provide a game that allows players with a wide range of levels to enjoy a time slot group battle without regard for level.

Embodiments of the present disclosure have been conceived in light of these circumstances and provides a game control method, a system, and a non-transitory computer-readable recording medium that allow a wide range of players to enjoy a group battle without regard for difference in level, degree of attack strength, or the like and that, in a group battle limited to a time slot, improve the participation rate throughout the set time slot.

A game control method according to an exemplary aspect of the present disclosure can include the steps of: (a) dividing a battle time into a plurality of time slots in a battle game between groups with a battle time managing unit stored in a memory, the battle time managing unit further comprising a timer, and members of a group being characters stored in the memory, each character controlled by a player via a client device sending requests to a server; (b) setting a battle condition of at least one of the time slots in the plurality of time slots with a battle condition changing unit in the memory to differ from a battle condition of a second time slot in the plurality of time slots based on data from a battle condition extraction unit in the memory and a target changing unit in the memory; and (c) conducting the battle game on the server by a battle rendering unit in the memory based on the battle condition whereby at least one of the time slots in the plurality of time slots is different from the second time slot in the plurality of time slots.

According to exemplary embodiments, a battle game played in a predetermined time slot is divided into a plurality of time slots, such as a first portion, middle portion, and last portion, and a battle condition is changed in at least one of the subdivided time slots. By dividing the time slot of the battle game into a plurality of time slots and setting the battle condition for each time slot, a battle game that has conventionally been played under certain rules can be changed during the set time. In particular, by setting a battle condition that is advantageous for a certain target and by changing the battle condition in the time slot for the first half, for example, in which the participation rate in the time slot battle game is not high, an increase in the participation rate of characters throughout the time slots can be expected. Furthermore, circumstances that allow beginners to enjoy the battle can be created by setting the battle conditions for example to increase the attack strength of low-level characters, which correspond to beginners, and to favor beginners in the first half in which the participation rate in the battle is not very high.

The exemplary embodiments can provide a game control method, a system, and a non-transitory computer-readable recording and/or storage medium that allow a wide range of players to enjoy a group battle without regard for difference in level, degree of attack strength, or the like and that improve the participation rate in a group battle throughout the set time slot.

BRIEF DESCRIPTION OF DRAWINGS

Exemplary embodiments of the present disclosure will be further described below with reference to the accompanying drawings, wherein.

DETAILED DESCRIPTION

The following describes an exemplary embodiment of the present disclosure (the present embodiment) with reference to the drawings.

Figure 1:
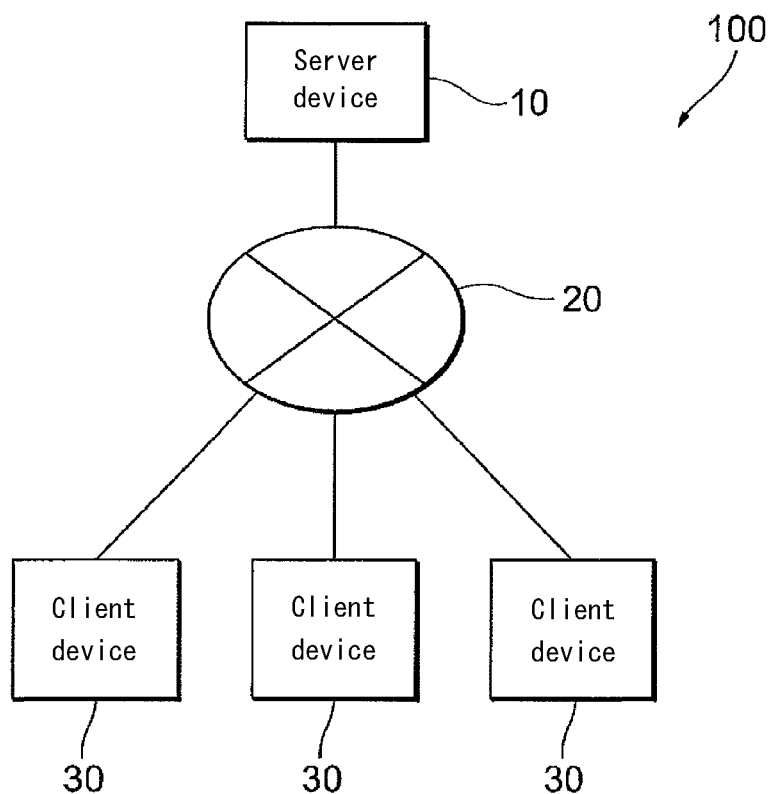
FIG. 1 illustrates the network structure of a game system according to the present embodiment.

FIG. 1 illustrates the network structure of a game system 100 according to the exemplary embodiment. The game system 100 includes a server device 10 that provides a battle game service to a plurality of client devices 30 over a network 20. The server device 10 is a network node having a function to provide the battle game service and is, for example, configured using a host computer with high computing power. The server device 10 is not, however, limited to this example and may be configured using a general-purpose communication terminal device. The client device 30 is a network node having a function to receive provision of the battle game service and is, for example, configured using a general-purpose communication terminal device. In the present disclosure, the network node that provides the battle game service is referred to as the "server device", and the network node that receives provision of the battle game service is referred to as the "client device", regardless of computing power. The online game service is provided by the server device 10 responding to a request from the client device 30.

The host computer constituting the server device 10 need not be only one computer and may be configured using a plurality of computers distributed over the network 20. Furthermore, the general-purpose communication terminal device constituting the server device 10 or the client device 30 also refers to a desktop computer, a notebook computer, a tablet computer, a laptop computer, and a mobile phone. The mobile phone may, for example, be a handheld mobile terminal such as PDC (Personal Digital Cellular), PCS (Personal Communication System), GSM® (Global System for Mobile communications), PHS (Personal Handy phone System), PDA (Personal Digital Assistant), or the like, capable of data communication under a standard such as W-CDMA (Wideband Code Division Multiple Access), CDMA-2000 (Code Division Multiple Access-2000), IMT-2000 (International Mobile Telecommunication-2000), Wibro (Wireless Broadband Internet), or the like. The network 20 is a communication network combining wired networks (such as a LAN (Local Area Network), WAN (Wide Area Network), or VAN (Value Added Network)) and wireless networks (such as a mobile communication network, satellite communication network, Bluetooth, WiFi (Wireless Fidelity), or HSDPA (High Speed Downlink Packet Access)), and the like. Between the server device 10 and the client devices 30 there may be provided a gateway server that converts the communication protocol between these devices.

Figure 2:
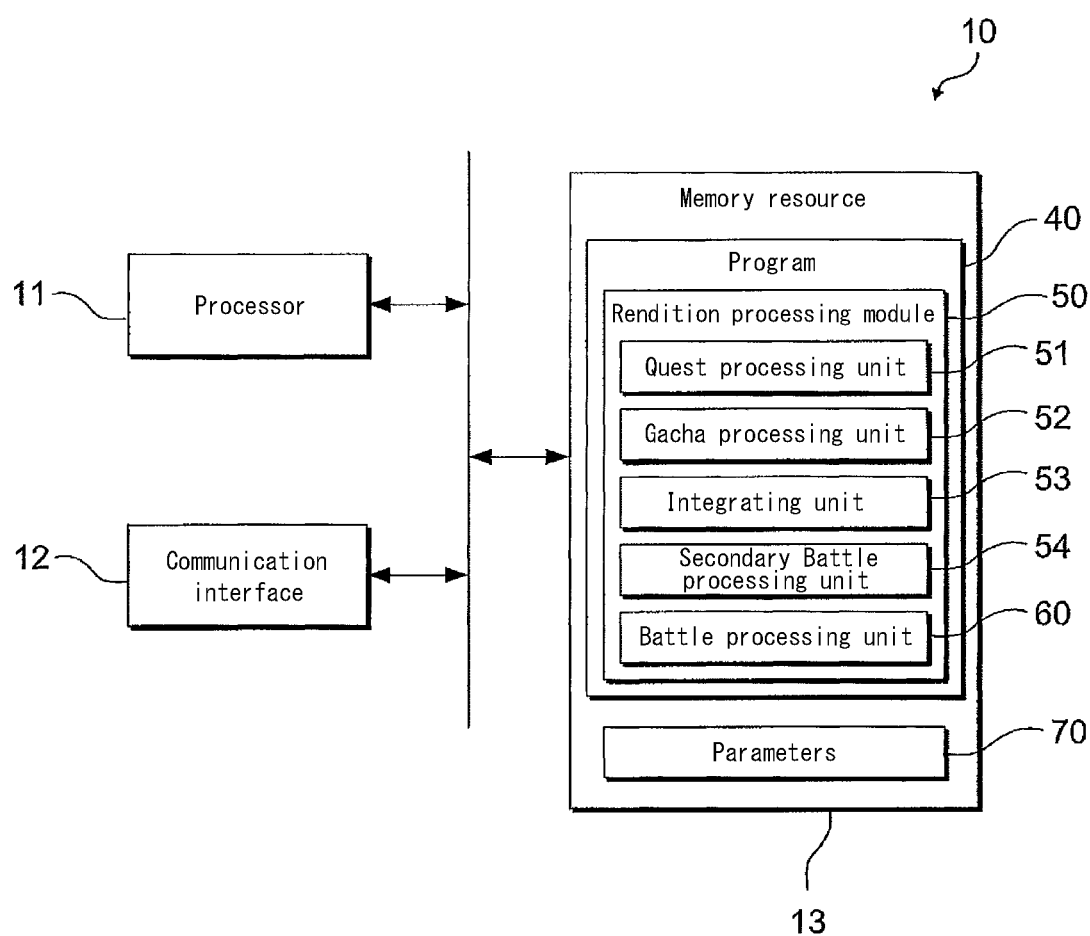
FIG. 2 is a block diagram illustrating the structure of a server device according to the present embodiment.

FIG. 2 is a block diagram illustrating the structure of the server device 10 according to the present embodiment. The server device 10 includes a processor 11, a communication interface 12, and a memory resource 13. The processor 11 is formed by an arithmetic logic unit, which performs arithmetic operations, logic operations, bit operations, and the like; various registers (program counter, data register, instruction register, general-purpose register, and the like); and a timer. The processor 11 decodes and executes a computer program 40 stored in the memory resource 13 and responds to requests from the plurality of client devices 30.

The computer program 40 is a program for executing game processing in response to requests from the plurality of client devices 30 and includes a plurality of software modules that are called and executed within a main program. Such software modules are each modularized subprograms for executing particular processing (processing for game operations, image display, communication, and the like) and are created using, for example, procedures, subroutines, methods, functions, data structures, and the like. A module is a unit that can be compiled independently.

As one such modularized subprogram, the computer program 40 includes a rendition processing module 50 provided with the function of the battle processing unit 60 (described below) that executes rendition processing for a battle between groups. In addition to the battle processing unit 60, in accordance with game specifications, the rendition processing module 50 for example includes functions such as a quest processing unit 51 that implements a quest, which is a search game, a gacha processing unit 52 that executes processing for a gacha (dispensing items that are part of a set), a integrating unit 53 that combines cards, and a secondary battle processing unit 54 that executes processing to battle an enemy character other than in the main battle, such as a raid boss that appears during a quest. The battle processing unit 60 is described in detail below, whereas details on the other processing units 51 to 54 are omitted, since these units are not specific to the exemplary embodiment.

The memory resource (memory unit) 13 stores parameters 70 for each character. Examples of the parameters 70 include a variable related to the attack strength of the character (specifically, a variable that conforms to changes in the character's "attack points" or the like), "skill types" listed on cards (described in detail below) used when attacking a character in the opponent group during a battle between groups, or particular "items" related to skills, and "attributes" of items or cards, yet the parameters 70 are not limited to these examples.

For example, a variable related to "defense points" or the like may be included, as may a variable indicating a "reward" obtained in the battle game. The value concept behind the reward is that a higher value yields a greater advantage against an opponent as the battle game progresses. The reward may, for example, be currency used to purchase an item within the game, an item that increases the character's attack strength, an item that heals the character's stamina or damage, or points that are added by inflicting damage on an enemy character. The reward may also have a value tradable between characters. Furthermore, the parameters 70 may include a variable indicating the length of time since the day the player participated in a battle game.

The memory resource 13 is, for example, a logical device that provides a memory area of a physical device (for example, a computer-readable recording and/or storage medium such as a disk drive, semiconductor memory, or the like). A plurality of physical devices may be mapped onto one logical device, or one physical device may be mapped onto a plurality of logical devices. Data, logs, and the like indicating the access history, play conditions, game progress status, and the like of each client device 30 are stored in the memory resource 13. The communication interface 12 is a hardware module for connecting to the client devices 30 over the network 20, such as an ISDN modem, ADSL modem, cable modem, or the like.

Figure 3:
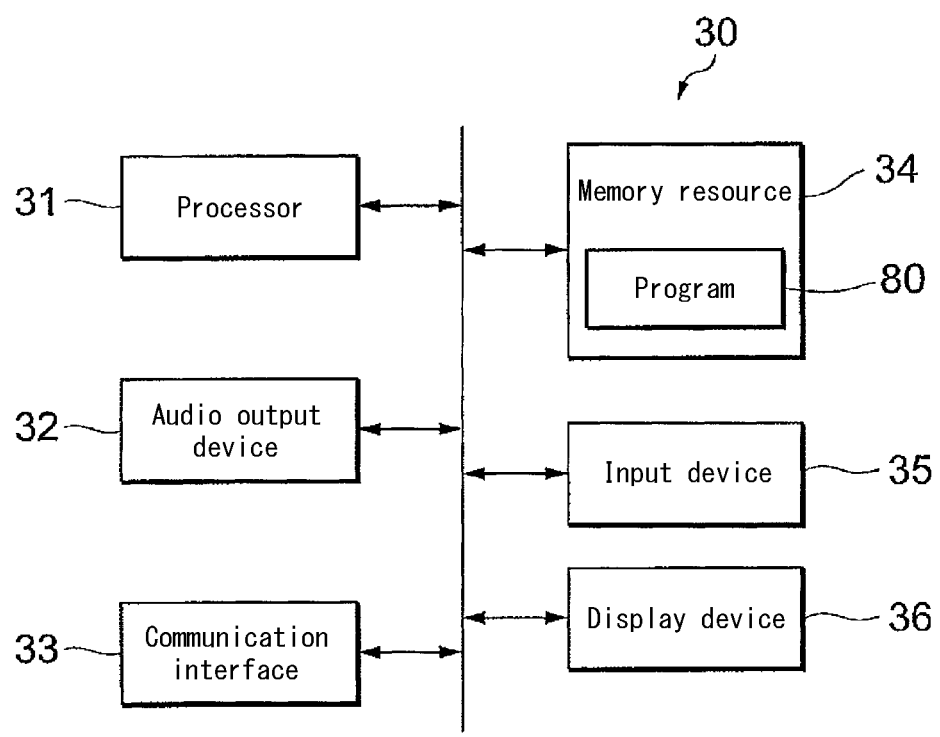
FIG. 3 is a block diagram illustrating the structure of a client device according to the present embodiment.

FIG. 3 is a block diagram illustrating the structure of the client device 30 according to the exemplary embodiment. The client device 30 includes a processor 31, an audio output device 32, a communication interface 33, a memory resource 34, an input device 35, and a display device 36. The processor 31 is formed by an arithmetic logic unit, various registers (program counter, data register, instruction register, general-purpose register, and the like), and a timer. The processor 31 decodes and executes a computer program 80 stored in the memory resource 34, transmits a request to the server device 10 in accordance with operation information input into the input device 35, and receives a response from the server device 10. The computer program 80 is an application program for connecting to the server device 10 and receiving provision of the battle game service. This application program can be distributed over the network 20 by the server device 10.

The memory resource 34 is a logical device that provides a memory area of a physical device (for example, a computer-readable recording and/or storage medium such as a disk drive, semiconductor memory, or the like) and also stores operating system programs, driver programs, various data, and the like used for processing by the client device 30.

Examples of driver programs include an input device driver program for controlling the input device 35 and output device driver programs for controlling the audio output device 32 and the display device 36. Examples of the various data include image data for objects, backgrounds, and the like that appear in the game screens.

The audio output device 32 is, for example, a sound player that can reproduce sound data such as game sound effects. The communication interface 33 provides a connection interface with the server device 10 and is configured using a wireless communication interface or a wired communication interface.

The input device 35 provides an interface that receives input operations from the player and is, for example, a touch panel, keyboard, mouse, or the like. The display device 36 provides a player with an image display interface for game screens or the like and is, for example, an organic EL display, liquid crystal display, CRT display, or the like.

When the player logs into the game service of the server device 10 by operating the input device 35 to input authentication information (an ID, password, or the like), a personalized screen associated with the player's authentication information is displayed on the display device 36.

On the personalized screen, a menu screen related to the group to which an individual player belongs is displayed. A "group" can be a virtual collection whose members are characters each controlled by a player via the client device 30. Such groups may be created and established for each game title or may be common to a plurality of game titles. In the field of social games, a group established for such a purpose is also referred to as a "guild", "party", "team", "community", or the like. A character can refer to a virtual object that obeys a player's instructions and acts in a virtual space on the player's behalf.

A character controlled by a player with experience participating in the game service provided by the server device 10 belongs to a group as a general rule, and the character's history is associated with the authentication information for the player and stored in the memory resource 13 of the server device 10. An editing menu screen related to the group is displayed on the display device 36 based on this history.

On the other hand, the character controlled by a player participating in the game service provided by the server device 10 for the first time does not belong to a particular group as a general rule, and therefore a menu screen belonging to any group (for example, a screen to search for a group or to establish a new group) is displayed on the display device 36. After the group to which the player belongs is determined or selected and the player selects to participate in the game service, a screen for a game event underway at that point in time is displayed on the display device 36.

Figure 4:
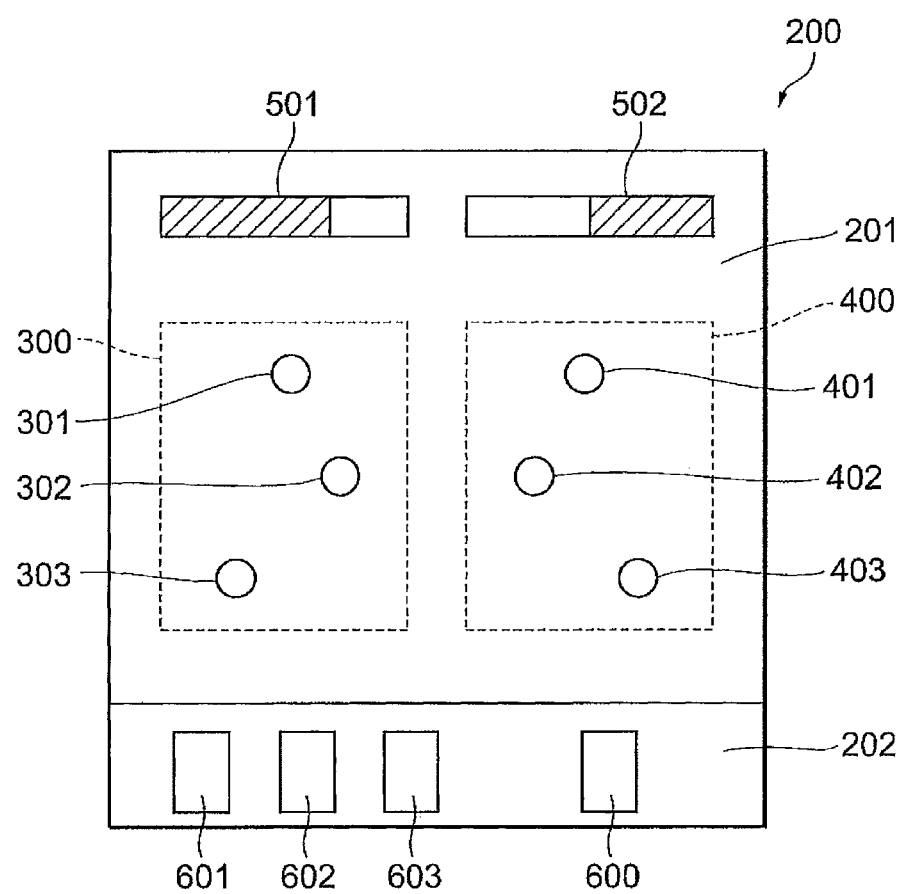
FIG. 4 illustrates an example of a game screen according to the present embodiment.

FIG. 4 illustrates an example of a game screen 200 according to the exemplary embodiment. The game screen 200 includes an event field 201 and a palette 202. The event field 201 is a virtual field on which the battle game progresses between groups 300 and 400. Characters 301, 302, and 303 belonging to one group 300 and characters 401, 402, and 403 belonging to the other group 400 are displayed in the event field 201.

The battle between groups is referred to as a "guild war" or "guild battle", or as "GvG" in reference to the initial letter of the word "guild". While communicating with each other, characters belonging to the same group attack opponent characters belonging to the opponent group.

The palette 202 is a virtual location for selecting the "skill" that can be used when each character attacks an opponent character. A deck 600, which is a stack of virtual cards, and a plurality of cards 601, 602, and 603 selected from the deck 600 are displayed on the palette 202. A display (an illustration or letter) indicating the type of skill and a particular item related to the skill are depicted on each card. Attack points (such as points for the skill or the invoked attack), defense points (stamina, life force, or the like), and attribute (fire, water, tree, earth, or the like) are set for each card.

Each player flips over the cards 601, 602, and 603 from the deck 600 and attacks the opponent character in accordance with the combination of the skills, attack points, specific items, defense points, and the like displayed on the cards 601, 602, and 603. The damage inflicted on the opponent character and the damage the player sustains are then calculated.

The gauge 501 indicates the number of times that characters 301, 302, and 303 belonging to the group 300 have consecutively attacked the opponent characters 401, 402, and 403. Similarly, the gauge 502 indicates the number of times that characters 401, 402, and 403 belonging to the group 400 have consecutively attacked the opponent characters 301, 302, and 303. The number of consecutive attacks is referred to as the "number of combos", and the gauges 501 and 502 displaying the number of combos are referred to as a "combo gauge".

Figure 5:
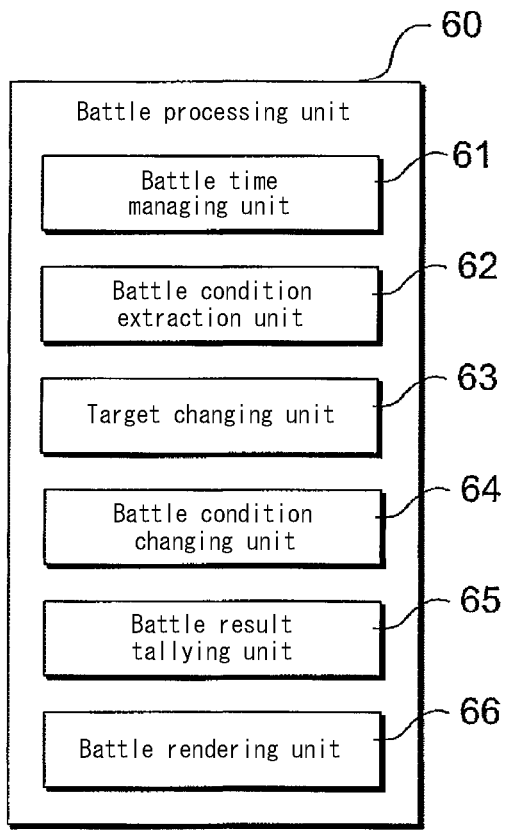
FIG. 5 is a functional block diagram illustrating the structure of battle processing according to the present embodiment.

As illustrated by the functional block in FIG. 5, the battle processing unit 60, which is one functional unit in the rendition processing module 50, includes a battle time managing unit 61, a battle condition extraction unit 62, a target changing unit 63, a battle condition changing unit 64, a battle result tallying unit 65, and a battle rendering unit 66.

Figure 6:
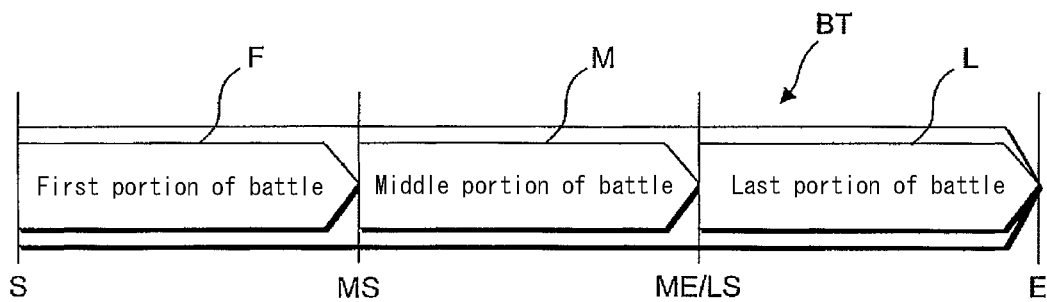
FIG. 6 is a conceptual diagram illustrating time management of a group battle according to the present embodiment.

The battle time managing unit 61 refers to the timer and the memory resource 13 to manage the time of a battle between groups. In addition to a start time S and an end time E, when the time managed by the battle time managing unit 61 is divided into a plurality of battle times BT (such as a three-way division into a first portion F, a middle portion M, and a last portion L), as illustrated in FIG. 6, the battle time managing unit 61 manages the start time (MS) and the end time (ME/LS) of the subdivided times. In other words, the battle time managing unit 61 has the functions of determining whether each start time and end time has been reached, of determining the end of the battle time, and of inputting the results of these determinations to the other functional units in the battle processing unit 60.

Various patterns depending on the game specifications are possible for the interval between the start time and the end time of the battle time slot, such as 30 minutes, one hour, two hours, and so forth. The battle time slot may also be divided in a variety of patterns, such as dividing in two, into a first half and a last half, or dividing into four or more time slots. An appropriate selection may be made in accordance with game specifications. Such information is stored in the memory resource 13.

The battle condition extraction unit 62 refers to the memory resource 13 to determine whether to change the conditions of the battle (the battle condition) as the battle takes place in a predetermined time slot. In other words, the battle condition extraction unit 62 is a manner of invoking a function to change a battle condition during the time slot group battle.

In this context, the term "battle condition" broadly includes additional conditions added on during a group battle. While also described in detail below, a battle condition can include changing the ability value of an individual character, such as changing the parameters 70 (see FIG. 2) that allow a character to exercise certain abilities during a battle, such as a character's attack strength, defense strength, or the like. Battle conditions also can include any sort of condition applied during a battle, such as providing a reward to the player controlling a character or tallying the battle result during the first portion of a subdivided time slot and reflecting the battle result in a subsequent portion of the subdivided time slot.

The target changing unit 63 refers to the memory resource 13 to set the target of change based on the extracted battle condition. For example, if the battle condition is to increase the level, attack points, or defense points of the lowest ranked n characters in the group, the target changing unit 63 extracts the n characters with the lowest level, the n characters with the lowest attack points, or the n characters with the lowest defense points as the target of change from a data table that lists the characters in the group, setting these characters as the target of change.

When the battle condition is, for example, to increase the attack points by 30% for characters or items such as cards classified under a predetermined attribute, such as fire, water, wind, tree, earth, or the like, the target changing unit 63 sets the characters or items with the attribute as the target of change from among the characters belonging to the group and from among a data table that lists the attributes of cards included in characters' decks, setting these characters or items.

The battle condition changing unit 64 changes the battle condition for the target of change that was selected by the target changing unit 63. Specifically, the battle condition changing unit 64 changes the parameters 70 (see FIG. 2) of the character or item that is the target of change. The parameters referred to here include an index of a character's strength in the battle, such as the attack points or defense points. For example, when the battle condition is to increase attack points of 10,000 points by 30%, the increased attack points become 13,000 points.

When, for example, the battle condition for the target changing unit 63 is to increase the level, attack points, or defense points of the lowest ranked n characters in the group by 30%, the battle condition changing unit 64 executes processing to increase the attack points of each extracted character by 30%. When the target of change is any character or card classified under the fire attribute, the battle condition changing unit 64 for example executes processing to increase the attack points of items with this attribute by 30%.

When the battle condition is to reflect a battle result tallied during the first portion of a subdivided time slot in later portions of the time slot, the battle result tallying unit 65 tallies the battle result during the corresponding portion of the time slot and outputs the result. In other words, as a battle condition for the first portion of a battle, the battle result tallying unit 65 has a function to tally the number of attacks, for example, by a character in the first portion. Based on the tallied result for the first portion, the above-described battle condition changing unit 64 then provides a predetermined reward as the battle condition for the last portion. Other than the above example of the number of attacks by a character, the total attack points or damage inflicted may be the battle result that is tallied. The participation rate or the like of group members may also be the target of tallying.

Based on the changed battle condition, the battle rendering unit 66 executes rendition processing for the game related to the battle. This function is not specific to the exemplary embodiment, and game processing is executed using any desired method. For example, a battle is rendered in accordance with the screen example illustrated in FIG. 4.

Next, examples of battle conditions and targets of change are described in detail with reference to FIGS. 7(*a*) and 7(*b*). Two types of examples are described below. In the first example, the battle condition is changed randomly or by a predetermined setting in each of the subdivided time slots (see FIG. 7(*a*)). In the second example, among the subdivided time slots, battle participation and battle results are tallied during an earlier time slot, and the tallied results are reflected in the battle conditions of time slots after the earlier time slot (see FIG. 7(*b*)).

Example of changing the battle condition as time progresses (1) Increasing attack strength of lowest ranked n characters in group: for example, among the characters that are members of the group, several of the characters with the lowest abilities available or necessary in the battle, such as level, attack points, or defense points, or the lowest 30% of the group members in terms of attack points are increased by 30%.

(2) Increasing item attribute attack points: for example, the attack points of characters or items such as cards classified under the attributes of fire, water, wind, tree, earth, or the like is increased by 10%.

(3) Increasing the attack points in accordance with player attribute: for example, depending on whether the gender of the registered player is male or female, the attack points are increased by 20%.

(4) Increasing the combo effect: the combo effect is changed by time slot. For example, in a time slot with a poor participation rate, such as the first portion of a group battle time, the regular increase in attack points of 10% each for consecutive attacks is boosted to 15% each.

The above changes in battle conditions are modified freely by time slot. FIG. 7(*a*) is a conceptual diagram for this example. As illustrated in FIG. 7(*a*), for example in the first portion of the battle, the battle condition is to "increase the attack points of the five members with the lowest battle ability by 30%". The battle condition for the middle portion of the battle is to "increase the attack points of cards classified under the water attribute by 30%". Furthermore, the battle condition for the last portion of the battle is to "increase the attack points of female players by 30%". The above-described percentage of the increase in attack points is merely an example and may be defined in accordance with game specifications. Furthermore, the target of change is not limited to the attack points in the above example and broadly includes the parameters 70 set for characters and items, including defense points, level, and the like.

In this way, circumstances that allow beginners to enjoy the battle can be created by favoring beginners in the first portion in which the participation rate in the battle is not very high. Furthermore, by changing the parameters that increase the attack points in the middle portion and the last portion, characters that satisfy these parameters are encouraged to participate. Hence, an increase in the participation rate in the battle can be expected.

The following is an example of changing battle conditions in accordance with battle participation and battle results:

Another example of changing battle conditions is to tally the battle participation by the group or to tally the results of the battle in an earlier time slot among the subdivided battle time slots. Furthermore, in the battle during a time slot after the earlier time slot, a predetermined battle condition may be set based on the tallied result. Examples are as follows.

(1) Providing an incentive based on an intermediate tally: for example, as a battle condition for the first half of the battle, the number of attacks by characters in the first half is tallied, and as a battle condition for the last half of the battle, a predetermined reward is provided based on the result for the first half. When the reward is a card usable in the last half of the battle, the reward may be made useful by, for example, providing an event bonus for the card and doubling the attack strength during the last half of the battle.

(2) Change in battle condition based on an intermediate tally: for example, each group's participation rate or number of participants in the first half of the battle is extracted. The attack strength during the last half is increased uniformly by 10% for a group that, in the first half, has a participation rate of at least a predetermined rate or a large number of participants.

Figure 7A:
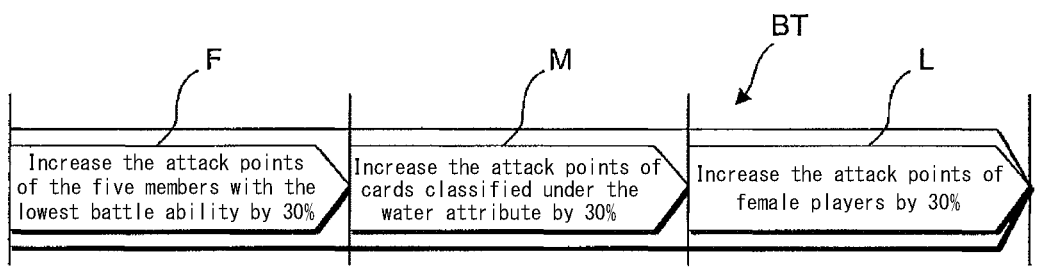
FIGS. 7(a) and 7(b) are conceptual diagrams illustrating examples of battle conditions and targets of change in a group battle according to the present embodiment.
Figure 7B:
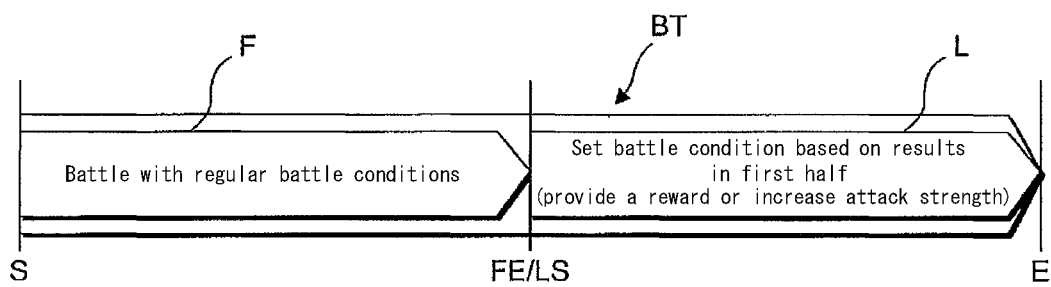

In the conceptual diagram for this example in FIG. 7(*b*), the battle results in the earlier time slot (first half F) are tallied, and the results are reflected in the subsequent time slot (last half L). In this way, in order to have an advantage in the last half L, which determines victory, it becomes necessary to participate and to battle actively in the first half F. Therefore, an increase in the participation rate across the entire time slot from the first half through the last half can be expected.

Figure 8:
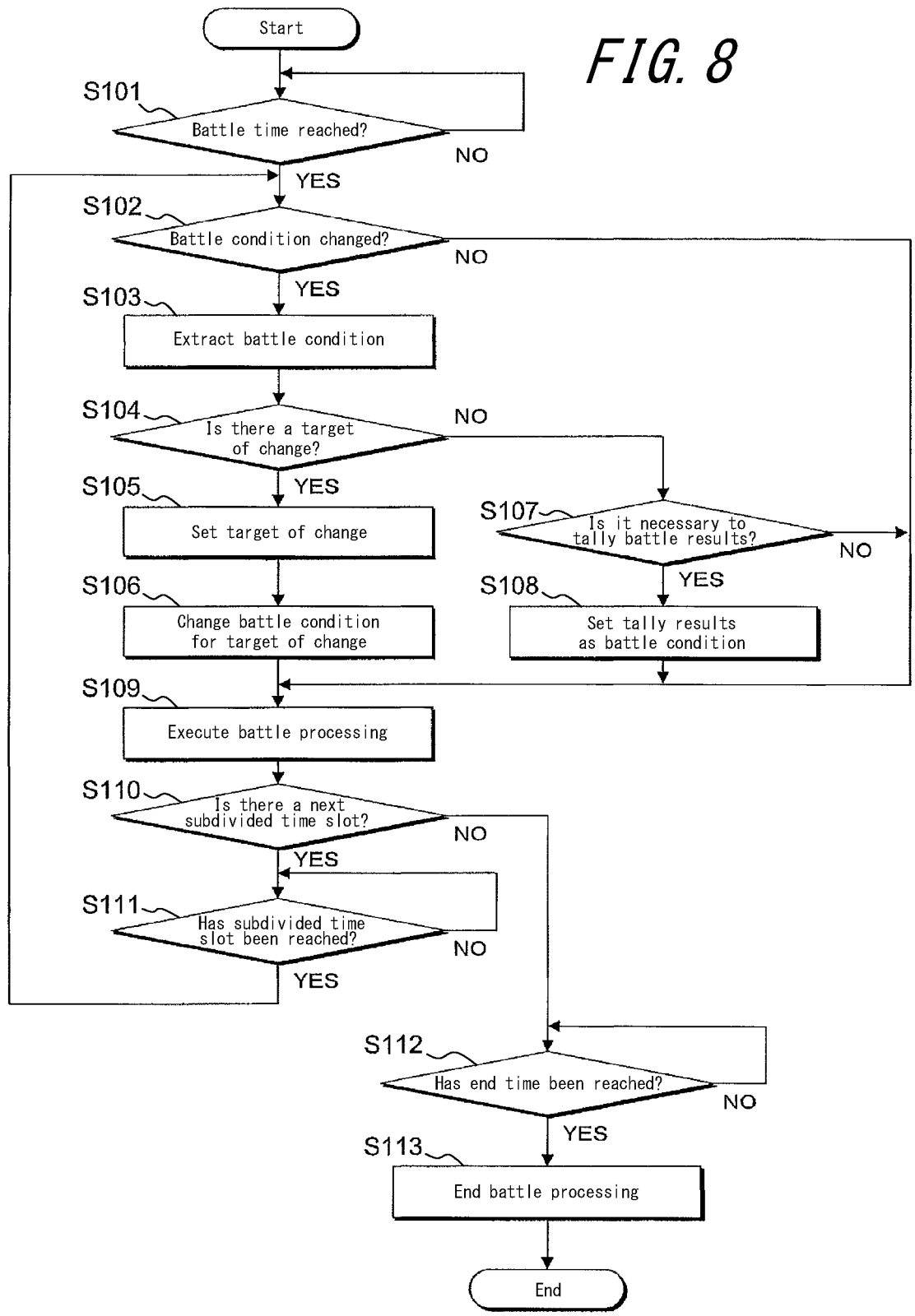
FIG. 8 is a flowchart illustrating battle processing according to the present embodiment.

FIG. 8 is a flowchart illustrating rendition processing by the battle processing unit 60 according to the present embodiment. The rendition processing module 50 is a subprogram written with a command set for causing the server device 10 to execute the function of the battle processing unit 60 via the processing from step 101 to step 110.

In the battle processing unit 60, the battle time managing unit 61 refers to the timer and the memory resource 13 and determines whether the time to hold a battle between groups, i.e. the start time of the battle, has been reached (step S101). In other words, the battle time managing unit 61 determines whether the start time S illustrated in FIG. 6 has been reached.

When determining that the start time of the battle has not been reached (step S101: NO), the battle time managing unit 61 repeats the processing in step S101. Conversely, when the battle time managing unit 61 determines that the start time of the battle has been reached (step S101: YES), the battle condition extraction unit 62 refers to the memory resource 13 to check whether a flag indicating a change in the battle condition during the battle is set (step S102).

When determining that a flag indicating a change in the battle condition during the battle is set (step S102: YES), the battle condition extraction unit 62 reads the battle condition to change from the memory resource 13 (step S103). Conversely, when determining that a flag indicating a change in the battle condition is not set (step S102: NO), the battle condition extraction unit 62 determines not to change the battle condition during the battle time slot, and processing proceeds to step S109.

Based on the battle condition read in step S103, the target changing unit 63 refers to the memory resource 13 to determine whether there is a character, or an item such as a card held by a character, that is the target of change in the battling groups (step S104). When determining that there is a target of change (step S104: YES), the target changing unit 63 extracts and sets the target of change (step S105).

The battle condition changing unit 64 changes the battle condition for the character or item set as the target of change (step S106), and processing proceeds to step S109.

On the other hand, when the target changing unit 63 determines that there is no character or item that is the target of change (step S104: NO), processing proceeds to step S107.

In step S107, it is determined whether the battle condition is not a target of change, i.e. whether the battle condition is not a character, or an item such as a card held by a character, that is the target of change in the battling groups, but rather to "tally battle results". When it is determined that the target condition is to tally battle results (step S107: YES), the battle result tallying unit 65 tallies the number of attacks by a character, the total attack points or damage inflicted, the participation rate of group members, or the like during the battle (step S108). When the target condition is determined not to be the tallying of battle results (step S107: NO), processing proceeds to step S109.

In step S109, the battle rendering unit 66 executes rendition processing based on the changed battle condition.

Next, in step S110, the battle time managing unit 61 determines whether there is a next subdivided time slot. As illustrated in FIG. 6, this is the case of determining whether there is a start time (MS) of a time slot yielded by dividing the battle time BT into a plurality of time slots.

In step S110, when determining that the next subdivided time slot (for example, MS in FIG. 6) exists (step S110: YES), the battle time managing unit 61 determines whether that subdivided time slot has been reached (step S111). When determining that the subdivided time slot has not been reached (step S111: NO), the battle time managing unit 61 repeats the processing in step S111. Conversely, when the battle time managing unit 61 determines that the subdivided time slot has been reached (step S111: YES), processing returns to step S102, and processing from step S102 to step S109 is repeated. As a result, processing to change the target condition for the next subdivided time slot (for example, the time slot "ME/LS" in FIG. 6) is executed.

On the other hand, when determining that there is no next subdivided time slot (step S110: NO), the battle time managing unit 61 then determines whether the end time has been reached (step S112). In other words, when determining that the end time of the battle (time "E" in FIG. 6) has not been reached (step S112: NO), the battle time managing unit 61 repeats the processing in step S112. Conversely, when the battle time managing unit 61 determines that the end time of the battle has been reached (step S112: YES), processing to end the battle is executed (step S113), thus ending the process (END).

According to the above embodiment, a battle game played in a predetermined time is divided into a plurality of time slots, such as a first portion, middle portion, and last portion, and a battle condition is changed in at least one of the subdivided time slots. By thus dividing the time slot of the battle game into a plurality of time slots and setting the battle condition for each time slot, a battle game that has conventionally been played under certain rules can be changed during a predetermined time when the battle game is played. In particular, in the first half of the battle, a battle condition that is advantageous for a certain target is set, for example by increasing the attack strength of low-level characters. The battle condition in the time slot for the first half, for example, in which the participation rate in the time slot battle game is not high, is also changed. By thus changing the battle condition by time slot, an increase in the participation rate of characters throughout the time slots can be expected.

In particular, setting the target of change for the battle condition to be an ability value that group members can exercise in the battle, such as attack strength or defense strength, allows for the changing of a rapid response parameter that yields an advantage in the battle. Players are thus stimulated to participate in the battle.

As described above, circumstances that allow beginners to enjoy the battle can be created by setting the battle conditions to increase the attack strength of low-level characters, which correspond to beginners, and to favor beginners to the game in the first portion of the battle in which the participation rate in the battle is not very high. Furthermore, by making changes to increase the attack points in the middle portion and the last portion, characters that satisfy these parameters are encouraged to participate, thereby leading to an increase in the participation rate in the battle and eliminating a sense of unfairness. A game that, without regard for level, is enjoyable and accessible can be provided for players with a wide range of levels.

As another battle condition, battle results in an earlier time slot (for example, the first half) are tallied, and the results are reflected in the battle conditions of time slots after the earlier time slot (for example, the last half). In this way, in order to have an advantage in the last half, which determines victory, it becomes necessary to participate in the first half and to be active in the battle by, for example, actively attacking the enemy in the first half as well while using up battle points. Therefore, an increase in the participation rate across a long time period from the first half to the last half can be expected.

The processing of the above-described embodiment is implemented by coordination between the rendition processing module 50 and the processor 11, yet similar rendition processing may be executed by a dedicated hardware resource (such as an application-specific integrated circuit (ASIC)) or by firmware.

The computer program 40 may, for example, be written in an object-oriented language. In an object-oriented language, battle game processing is made possible by treating each character 301 to 303 as an object, defining the parameters 70 as "attributes" of the characters 301 to 303, and defining the behaviors of the characters 301 to 303 (such as attacking) as "methods" of the characters 301 to 303. Image display can be controlled by treating not only the characters 301 to 303 but also the gauges 501 and 502, the cards 601, 602, and 603, and the like displayed on the game screen 200 as objects and defining their "attributes" and "methods".

The computer program 40 is not, however, limited to an object oriented language and may be written in a procedural language, for example. The computer program 40 can be encoded into a predetermined signal format and transmitted between nodes over a transmission medium (wired communication network) or a transmitted wave (radio waves).

The above-described exemplary embodiment is only an example for describing aspects of the present disclosure, and the present disclosure should not be interpreted as limited to the above exemplary embodiment. Furthermore, various modifications may be made without departing from the scope of the present disclosure. For example, a person of ordinary skill in the art could replace the resources described in the embodiment (hardware resources and software resources) with equivalents, and such replacements are also included in the scope of the present disclosure.

The battle game described in this specification can also be controlled by a server system including more than one server device 10.

The invention claimed is:

1. A method for controlling a video battle game between groups, each of said groups formed by plural players, the video battle game being conducted by use of virtual game objects, each of said virtual game objects controlled by a player via a client device, the method comprising steps of:
   during a first term of the video battle game, said video battle game divided into a predetermined number of terms, conducting a battle under a first battle condition between the groups, said first battle condition specific to the first term, wherein conducting the battle under the first battle condition comprises changing at least one characteristic of at least one virtual game object based on the first battle condition;
   setting a second battle condition in a second term of the video battle game based on a result of the first term of the video battle game, said second battle condition specific to the second term;
   automatically transitioning from the first term to the second term;
   conducting the battle under the second battle condition between the groups, wherein conducting the battle under the second battle condition comprises changing at least one second characteristic of at least one second virtual game object based on the second battle condition;
   causing at least one user interface provided on at least one client device to be periodically updated, wherein causing the at least one user interface to be periodically updated comprises progressing a timer from a start time to an end time of the video battle game and updating the at least one user interface based on the timer;
   determining, based on a current timing and a start timing of the video battle game, whether a first predefined end timing has been reached, and concluding the first term of the video battle game at the first predefined end timing based on the start timing of the video battle game; and
   determining, based on the current timing and the start timing of the video battle game, whether a second predefined end timing has been reached, and concluding the second term of the video battle game at the second predefined end timing based on the start timing of the video battle game;
   wherein the first battle condition is unchanged during the first term and the second battle condition is unchanged during the second term.

2. The method of claim 1, wherein the second battle condition is set based on activity of at least one of the virtual game objects in the first term.

3. The method of claim 1, further comprising steps of:
   determining whether a participation rate or a number of participants in a group in the first term is higher than a set value;
   based on the participation rate or the number of participants in the group in the first term being higher than the set value, changing the at least one second characteristic of the at least one second virtual game object.

4. The method of claim 1, further comprising steps of:
   providing a reward useable in the second term to at least one player according to the result of the first term;
   changing the at least one second characteristic of the at least one second virtual game object based on the reward.

5. The method of claim 1, wherein the video battle game is conducted against an opponent virtual game object.

6. The method of claim 1, wherein the video battle game comprises a third term under a third battle condition, the method further comprising steps of:
   determining whether a participation rate or a number of participants in a group in the second term is higher than a set value;
   if the participation rate or the number of participants in the group in the second term is higher than the set value, changing at least one parameter of a virtual game object used by a player in the group as th third battle condition;
   conducting the battle in the third term based on the at least one changed parameter.

7. The method of claim 1, wherein the video battle game comprises a third term under a third battle condition, the method further comprising steps of:
   providing a reward useable in the third term to at least one player in a group according to a result of the second term;
   changing at least one parameter of the virtual game object used by a player in the group based on the reward;
   conducting the battle in the third term based on the at least one changed parameter.

8. A game apparatus configured to provide a video battle game between groups, each of said groups formed by plural players, the video battle game being conducted by use of virtual game objects, each of said virtual game objects controlled by a player via a client device, the game apparatus comprising a communication interface configured to communicate with a plurality of client devices, and a rendition processing module comprising a battle processing unit;
   wherein the battle processing unit is configured to:
   during a first term of the video battle game that is divided into a predetermined number of terms, conduct a battle under a first battle condition between the groups, said battle condition specific to the first term, wherein conducting the battle under the first battle condition comprises changing at least one characteristic of at least one virtual game object based on the first battle condition;
   set a second battle condition in a second term of the video battle game based on a result of the first term of the video battle game, said second battle condition specific to the second term;
   automatically transition from the first term to the second term; and
   conduct the battle under the second battle condition between the groups, wherein conducting the battle under the second battle condition comprises changing at least one second characteristic of at least one second virtual game object based on the second battle condition;
   cause at least one user interface provided on at least one client device to be periodically updated, wherein causing the at least one user interface to be periodically updated comprises progressing a timer from a start time to an end time of the video battle game and updating the at least one user interface based on the timer;
   determine, based on a current timing and a start timing of the video battle game, whether a first predefined end timing has been reached, and conclude the first term of the video battle game at the first predefined end timing based on the start timing of the video battle game; and
   determine, based on the current timing and the start timing of the video battle game, whether a second predefined end timing has been reached, and conclude the second term of the video battle game at the second predefined end timing based on the start timing of the video battle game;

wherein the first battle condition is unchanged during the first term and the second battle condition is unchanged during the second term.

9. The game apparatus of claim 8, wherein the second battle condition is set based on activity of at least one of the virtual game objects in the first term.

10. The game apparatus of claim 8, wherein the battle processing unit is configured to:

determine whether a participation rate or a number of participants in a group in the first term is higher than a set value;

based on the participation rate or the number of participants in the group in the first term being higher than the set value, change the at least one second characteristic of the at least one second virtual game object.

11. The game apparatus of claim 8, wherein the battle processing unit is configured to:

provide a reward useable in the second term to at least one player according to the result of the first term;

change the at least one second characteristic of the at least one second virtual game object based on the reward.

12. The game apparatus of claim 8, wherein the video battle game is conducted against an opponent virtual game object.

13. The game apparatus of claim 8, wherein the video battle game comprises a third term under a third battle condition, and wherein the battle processing unit is configured to:

determine whether a participation rate or a number of participants in a group in the second term is higher than a set value;

if the participation rate or the number of participants in the group in the second term is higher than the set value, change at least one parameter of a virtual game object used by a player in the group as the third battle condition; and conduct the battle in the third term based on the at least one changed parameter.

14. The game apparatus of claim 8, wherein the video battle game comprises a third term under a third battle condition, and wherein the battle processing unit is configured to:

provide a reward useable in the third term to at least one player in a group according to a result of the second term;

change at least one parameter of the virtual object used by a player in the group based on the reward; and conduct the battle in the third term based on the at least one changed parameter.

15. A computer program product embodied on a non-transitory computer-readable medium and containing instructions that, when executed, causes a game apparatus provided with a memory unit to provide a video battle game between groups, each of said groups formed by plural players, the video battle game being conducted by use of virtual game objects, each of said virtual game objects controlled by a player via a client device, the game apparatus thereby being configured to perform steps of:

during a first term of the video battle game, said video battle game divided into a predetermined number of terms, conducting a battle under a first battle condition between the groups, said first battle condition specific to the first term, wherein conducting the battle under the first battle condition comprises changing at least one characteristic of at least one virtual game object based on the first battle condition;

setting a second battle condition in a second term of the video battle game based on a result of the first term of the video battle game, said second battle condition specific to the second term;

automatically transitioning from the first term to the second term;

conducting the battle under the second battle condition between the groups, wherein conducting the battle under the second battle condition comprises changing at least one second characteristic of at least one second virtual game object based on the second battle condition;

causing at least one user interface provided on at least one client device to be periodically updated, wherein causing the at least one user interface to be periodically updated comprises progressing a timer from a start time to an end time of the video battle game and updating the at least one user interface based on the timer;

determining, based on a current timing and a start timing of the video battle game, whether a first predefined end timing has been reached, and concluding the first term of the video battle game at the first predefined end timing based on the start timing of the video battle game; and determining, based on the current timing and the start timing of the video battle game, whether a second predefined end timing has been reached, and concluding the second term of the video battle game at the second predefined end timing based on the start timing of the video battle game;

wherein the first battle condition is unchanged during the first term and the second battle condition is unchanged during the second term.

16. The computer program product of claim 15, wherein the second battle condition is set based on activity of at least one of the virtual game objects in the first term.

17. The computer program product of claim 15, wherein the non-transitory computer-readable medium further comprises instructions to configure the game apparatus to perform steps of:

determining whether a participation rate or a number of participants in a group in the first term is higher than a set value;

based on the participation rate or the number of participants in the group in the first term being higher than the set value, changing the at least one second characteristic of the at least one second virtual game object.

18. The computer program product of claim 15, wherein the non-transitory computer-readable medium further comprises instructions to configure the game apparatus to perform steps of:

providing a reward useable in the second term to at least one player according to the result of the first term;

changing the at least one second characteristic of the at least one second virtual game object based on the reward.

19. The computer program product of claim 15, wherein the video battle game is conducted against an opponent virtual game object.

20. The computer program product of claim 15, wherein the non-transitory computer-readable medium further comprises instructions to configure the game apparatus to perform steps of:

determining whether a participation rate or a number of participants in a group in the second term is higher than a set value;

if the participation rate or the number of participants in the group in the second term is higher than the set value, changing at least one parameter of a virtual game object used by a player in the group as a third battle condition;

conducting the battle in a third term based on the at least one changed parameter.

21. The computer program product of claim 15, wherein the non-transitory computer-readable medium further comprises instructions to configure the game apparatus to perform steps of:

providing a reward useable in a third term to at least one player in a group according to a result of the second term;

changing at least one parameter of the virtual game object used by a player in the group based on the reward;

conducting the battle in the third term based on the at least one changed parameter.

\* \* \* \* \*